United States Patent [19]
Keil

[11] Patent Number: 5,671,795
[45] Date of Patent: Sep. 30, 1997

[54] ROLL-UP CURTAIN BAR ATTACHMENT DEVICE FOR FLEXIBLE SHEETING

[75] Inventor: Kurt A. Keil, Pottsville, Pa.

[73] Assignee: Advancing Alternatives, Inc., Pottsville, Pa.

[21] Appl. No.: 709,863

[22] Filed: Sep. 10, 1996

[51] Int. Cl.[6] .................................................... A47H 13/00
[52] U.S. Cl. ........................................... 160/384; 160/391
[58] Field of Search ...................................... 160/383, 384, 160/391, 395, 399, 402, 327, 368.1, 330, 349.1; 52/63, 222

[56] References Cited

U.S. PATENT DOCUMENTS

| | | | |
|---|---|---|---|
| 793,967 | 7/1905 | Upperman | 160/391 X |
| 1,018,272 | 2/1912 | Ross | 160/395 |
| 1,233,314 | 7/1917 | Costello | 160/395 |
| 1,909,109 | 5/1933 | Kopfstein | 160/384 |
| 3,524,491 | 8/1970 | Olson | 160/384 X |
| 4,057,095 | 11/1977 | Hirota | 160/395 X |
| 4,144,622 | 3/1979 | Yoshinari | 160/395 X |
| 4,193,235 | 3/1980 | Cucchiara | 52/222 X |
| 4,393,915 | 7/1983 | Olson | 160/384 X |
| 4,763,452 | 8/1988 | Harvey | 160/395 X |

*Primary Examiner*—David M. Purol
*Attorney, Agent, or Firm*—A. R. Eglington

[57] ABSTRACT

An improved two-piece, gripping bar device for securing and selective roll-up of flexible sheeting useful in screening outdoor rigid structures, like greenhouses. The identical rod-like pieces present a shape having an elongate cylindrical form upon conjoining which device grips a length of sheeting. The pieces permit firm mating by virture of a tapered ridge on the contacting surface of each member which compliments an opposing tapered recess on the opposing surface of the other member, so that each member presents a pair of parallel, linear ridges and linear recesses. Central of the arcuate outer surface of the device is at least one elongate channel adapted to receive and retain either a second or third sheet of flexible material and thus be rolled-up with the inner sheeting to selected vertical heights.

10 Claims, 5 Drawing Sheets

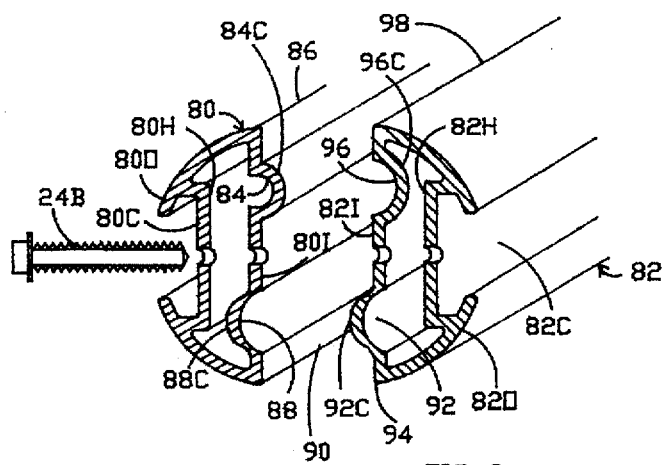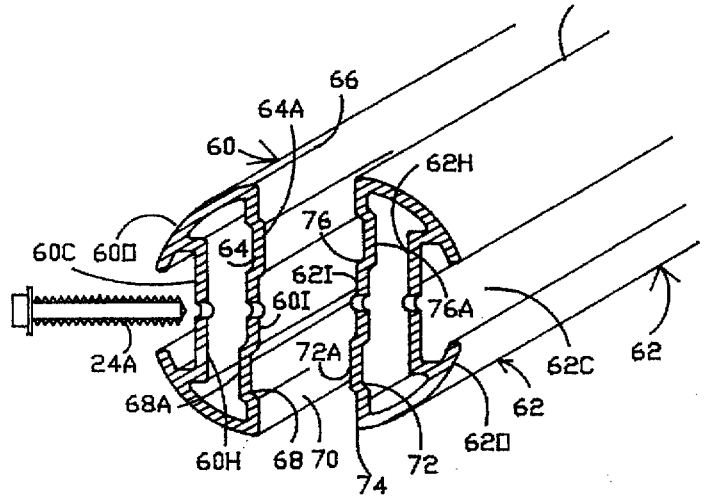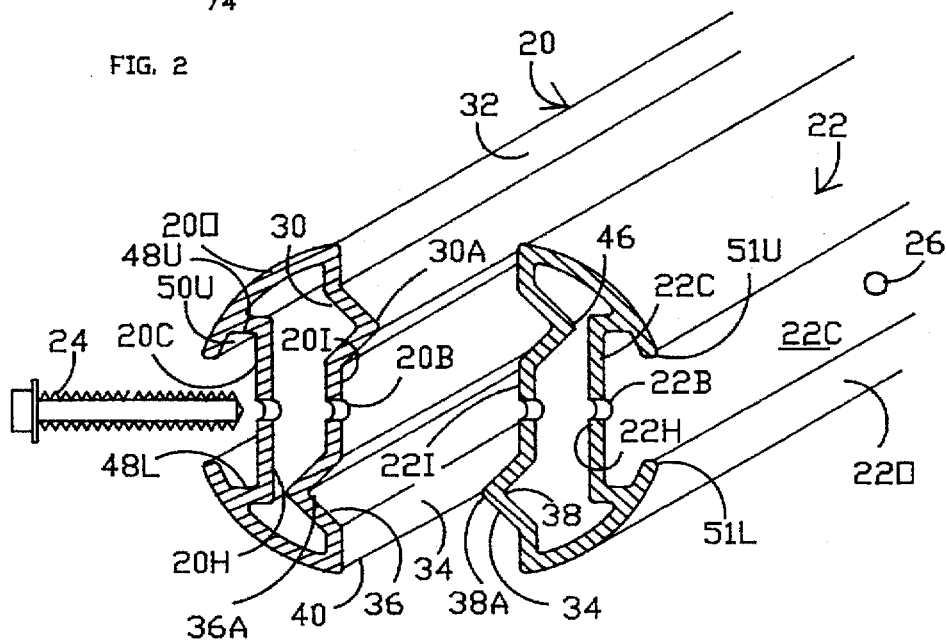

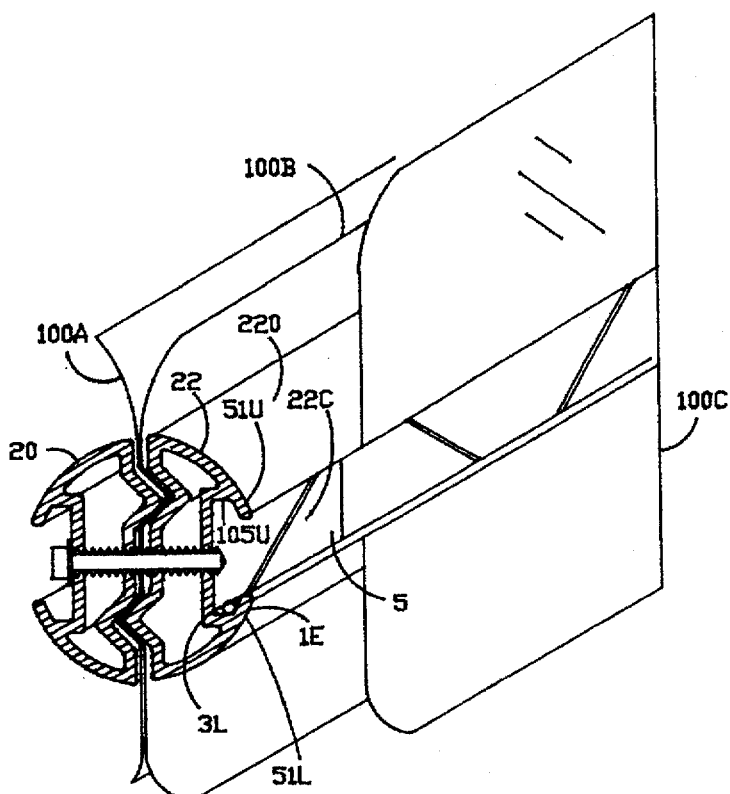
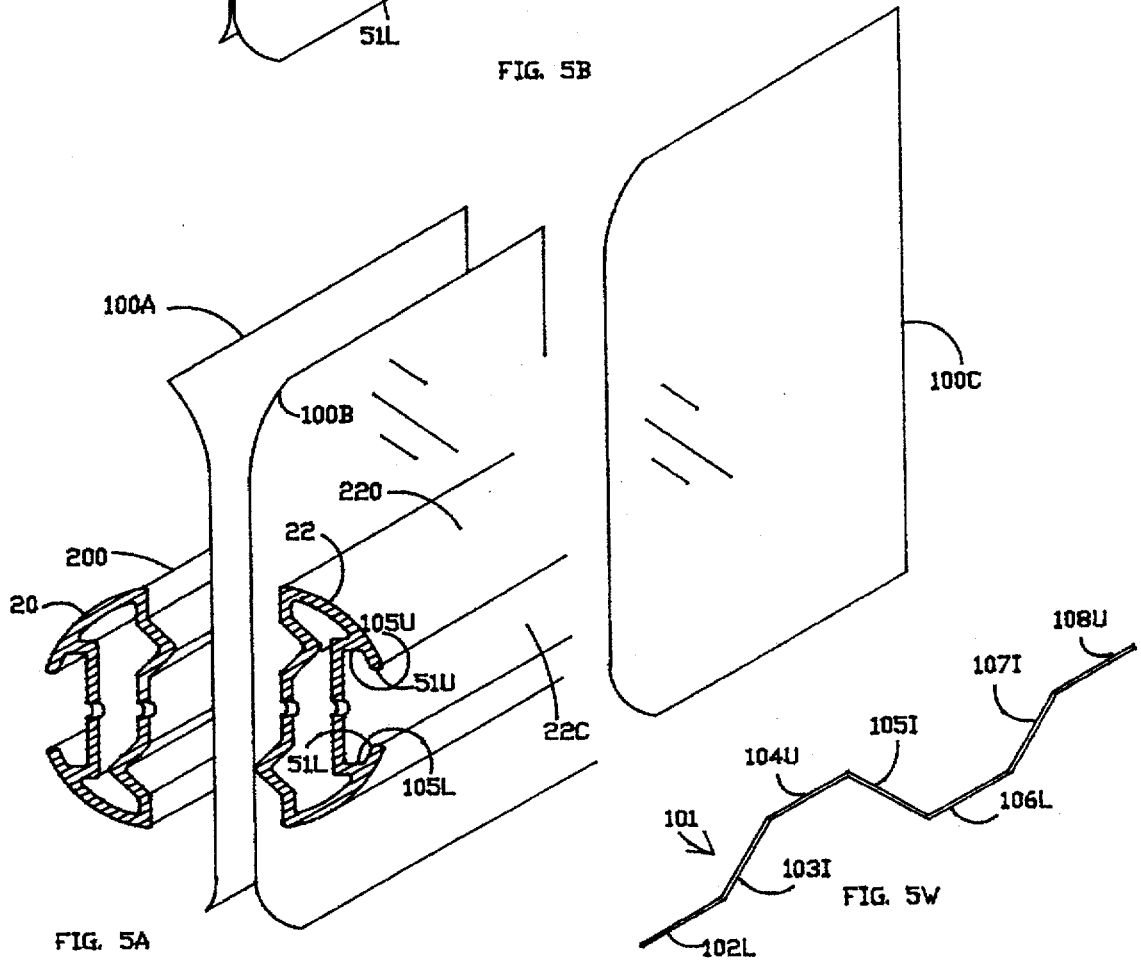

ROLL-UP CURTAIN BAR ATTACHMENT DEVICE FOR FLEXIBLE SHEETING

FIELD OF THE INVENTION

The field of the invention are sheet gripping means and it relates to clamping of flexible materials, like films and textile fabrics to an elongated bar in a manner that allows the flexible material to roll up on the bar and around itself.

BACKGROUND OF THE INVENTION

Most modern greenhouses utilize adjacent dual polymeric material sheets to cover the structural members of the building, which are then inflated therebetween to provide an insulative and highly translucent roofing and sidewall covering. The sunlight passing through the coverings heats the structure so intensely during warmer periods, that sufficient ventilation of the structure becomes difficult to maintain, even with multiple high speed exhaust fans which require large quantities of expensive electrical power. The trend today is towards opening as much of the building side walls, end walls, and even the roof area, as possible, to lessen or eliminate the need to run electric exhaust fans and to rely more on natural ventilation. The flexible material (fabric) is fastened at the top to a structural member of a building in a fashion that allows the fabric to drape evenly downward along its entire length.

Roll-up walls are being used to provide natural ventilation, but most methods of attachment have been to splice pipes together by threading, riveting, swaging, or bolting, and to tape, clip, and/or clamp the covering to the assembled bar. In order to inflate the space between the two layers during cold weather when the cover is in its closed position, the covering must be wrapped a couple times around the roll bar and clamped in a fashion to the side of the building to prevent unwinding and loss of air inflation.

Modern farming practices are also utilizing shelters, barns, or specialized buildings to house cattle, swine, poultry, etc. in more controlled environments to maximize production. Natural ventilation during warm periods is preferred for large animal shelters such as cattle. The sides and much of the ends are often opened completely to allow maximum air circulation through the shelters. Although swine and chicken houses are usually more contained, with a greater reliance on exhaust fans, larger curtain vents are being gradually implemented to allow greater intake of air.

Most animal shelters are presently using drop-down curtains, because roll-up curtains in the past have not had reliable clasping abilities, nor easy to maintain and have been cumbersome to install. Drop curtains, however, are subject to rodent damage in the pleats and folds that occur as the curtain is lowered and often collect much debris and water in the folds of the curtain in their open dropped position. They also require complicated pulley and cable systems to raise the long lengths.

Most existing roll-up bars, which are joined by butting the ends of the pipes, or structural members, together, rely on splicing of the bars with internal or external splices and require rivets, bolts or screws through the splice points. This focuses the weakest point of the bar at each splice joint. External splices and/or fabric holding clips will cause an unevenness of the wrap of fabric sheeting around the roll-up bar. Also, if a section of the roll-up is damaged, and must be replaced, unless the splices are external splices, the fabric attached along the entire length of the outside of the bar will prevent replacement of the damaged section, unless the fabric is disassembled from the bar, beginning with the damaged section and continuing to one of the ends of the bar.

If a special groove is molded into the longitudinal length of the attachment for insertion of another extrusion, etc., the roll-up bar and its gripping member must be utilized with a fabric, or fabrics, having thicknesses that are sized specifically for the opening. If it is too thin, the fabric will pop out; and, if it is too thick, the mating members and fabric cannot be seated into the groove.

It is therefore a principal object of the invention to provide a elongated sheet gripping device that concurrently permits the flexible sheeting to roll up upon the device itself.

It is another object of the invention to provide a device comprising a readily fabricated, two-member gripping bar means that presents a substantially cylindrical external surface adapted for sheeting roll-up.

A yet further object of the invention is to fabricate a single elongate member, providing same with a planar surface which is complemental of a second elongate member, which members engage sheeting therebetween in a firm, but interruptible manner, without tearing or marring such sheeting during the course of repeated sidewall repositionings.

A still further object of the invention is to obviate the need for splicing pieces in extended length devices by overlapping of mateable lengths, allowing much of the normal stability of each assembly to occur at each lap joint of two members.

Another object of the invention is to allow firm gripping of one sheet of flexible fabric, or two or more sheets of flexible fabric, and allow gripping of total fabric(s) widths from extremely thin material to total thicknesses that can still be flexible enough to wrap around the proportionate size of roll up bar diameter.

SUMMARY OF THE INVENTION

The present invention is to provide an improved two-piece, gripping device that will clasp one fabric sheet, or multiple fabric sheets, with a broader range of total thicknesses than what is readily available now. This invention can be extended to considerably long lengths by an overlapping of the members, but in a manner that eliminates internal or external splice pieces. The resulting cross section of the dual mated members will present a generally rounded shape or cylinder, without radially protruding splices, clamps or screws, that would tend to cause the fabric being rolled around the bar to wind unevenly, or to tear. The fabric, as it passes between the two members, will change direction several times, which will enhance the gripping ability of the roll-up bar, as compared to relying on a squeezing action only. As the two members are identical to permit mating, a tapered ridge on each member extends into a corresponding tapered recess on the opposing member. The members are self-aligning, as they are clamped to both sides of the flexible fabric; but they cannot be mated together backwards.

The present invention is for an improved device, wherein each member may be formed through a single extrusion die (for aluminum, polymeric materials, such as PVC plastic, etc.), or may be formed by a single rolling or molding form (for steel, or other materials that are not shapeable by extruding). Each member is fabricated to have a longitudinal ridge or protrusion along its planar mating surface, which is preferably tapered for easy mating into a longitudinal tapered recess, or indentation, on the mating member. Each member forms a semi-cylinder that, when mated with its opposing like member, will form a generally cylindrical device adapted for rolling a flexible material around it. The two mating members are joined together by self-tapping screws that go through on one member channel then through the fabric, and self-tap into the opposing channel of the other member, thereby gripping both sides of the fabric.

The linear ridge of each member will push the fabric into the linear recess of the other member. The taper of the ridges, and matching and corresponding taper of the recesses, will cause the two members to align themselves with each other, as the two members are compressed by hand against the two sides of the fabric, before the self-tapping screws are inserted for operation.

Preferably, each member channel is predrilled at suitable intervals to provide for easy insertion of a self-tapping screw through the one member, which may self-drill and tap itself into the undrilled portion of the opposite extrusion, at a point approximately half way between the opposing self-tapping screws. In this way, for example, if suitable gripping action is attained from placing a clamping fastener every 12", then predrilling the member every 24" and also lapping the members so that opposing fasteners fall between each other, the indicated 12" fastening intervals will be obtained. Each member on the outside curved portion of the generally half-circle shape is provided with a recessed channel, to accept the heads of the fastening screws, so that they do not protrude above the cylindrical surface.

The device does not require internal or external splices, but can instead be extended to quite long lengths by cutting one of the two starting members in half. By mating the standard length members with one of the half-length members, in a manner that also alternates the fasteners, the roll-up bar can be extended by lapping full length members alternately until the desired length is achieved, mating the other half-length extrusion at the free end, and then trimming the completed roll-up bar to finished length.

The invention allows for a larger variation of total thickness of fabric, or fabrics, to be clamped between the two members, than possible with existing roll up bars, which have fabric insertion sockets and their specially sized mating clips. The resulting change of six planar directions the fabric(s) make, when clasped between the seven mating surfaces (FIG. 1) of the preferred embodiment, creates a positive gripping action along the changing surface angles and for the entire length of the roll-up bar, allowing for inflation between fabric layers above the bar without air loss through the clasping surfaces.

BRIEF DESCRIPTION OF THE DRAWINGS

FIG. 1 is a perspective view of a pair of elongate members forming the gripping means for flexible sheeting of the present invention;

FIG. 2 is a like perspective view of an alternate embodiment for a pair of members forming the gripping means of the invention;

FIG. 3 is a like perspective view of a second alternate embodiment for a pair of members forming the gripping means of the present invention;

FIG. 5A depicts the embodiment of FIG. 1 while still spaced apart but having dual sheeting interposed therebetween along with a separate third sheeting positioned offset from the device;

FIG. 5B depicts FIG. 5A when the third sheeting is engaged externally of the gripping means of the present invention;

FIG. 5W is a perspecitive view of the wire spring element that cooperates with the external channel;

DESCRIPTION OF THE PREFERRED EMBODIMENTS

Figure 7:
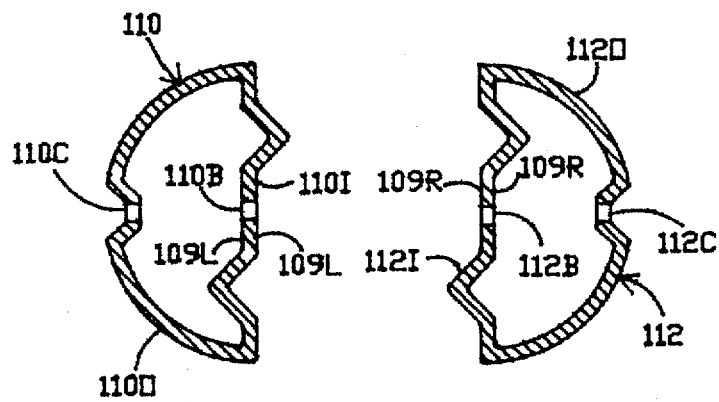
FIG. 7 is an elevational end view an alternate embodiment of the device.

Referring now to the drawing, and to FIG. 1 in particular, the perspective view shows a pair of initially spaced-apart, elongate rigid members 20 and 22, each presenting a specially-configured vertical cross-section. The major cross-sectional features are: generally planar inner surfaces 20 I/22 I; generally arcuate, outer surfaces 20 O/22 O; linear, externally-located, recessed channels 20 C/22 C; and linear internal hollow chambers 20 H/22 H, of an irregular cross-section, which cross-section is as defined by the configuration of surfaces 20 I, 20 O and 20 C, in the depiction of member 20. An elongate threaded bolt 24 is positioned to horizontally traverse the linear members via opposing boreholes 20 B/22 B. Offset from the presented longitudinal end of opposing members 20/22, is another borehole 26, and a like threaded bolt (not seen), which will further fasten the members 20/22 together at a linear spacing of between 18" and 29". Alternately, self-drilling TEK screws, well known to the fastener art, may be employed.

The inner surface 20 I is provided with a projecting elongate linear ridge 30, preferably in the form of an outstanding triangle, the apex 30 A of which ridge is beveled to preclude projecting sharp edges. Ridge 30 is disposed lengthwise of member inner surface 20 I, and is aligned proximal to the upper linear edge 32 of such surface 20 I. It is thusly aligned parallel to the longitudinal dimension of inner surface 20 I.

The lower segment of 34 of inner surface 20 I is also provided with an inwardly projecting, linear channel 36, also conveniently in the form of an isosceles triangle, the apex 36 A of which channel 36 is somewhat rounded to complement the beveled apex 38 A of the opposing lower edge ridge 38 of facing member 22. Channel 36 is also disposed lengthwise of member 20, and is located proximal to the lower linear edge 40 of surface 20 I.

Ridge 30 and channel 36 of member 20 are spaced apart equidistant throughout their elongate length; they essentially straddle an invisible longitudinal center line (not seen) of inner surface 20 I, running through borehole 20 B.

Opposing member 22 is provided on its lower inner surface 22 I, with elongate linear ridge 38, and parallel channel 46, both of a substantially identical, surface configuration to those counterparts of member 20, except that channel 46 of member 22 opposes ridge 30 of member 20, and ridge 38 of member 22 opposes channel 36 of member 20. In fact, members 20 and 22 are fabricated so as to be one and the same pieces structurally, varying, as shown here, only in their spatial juxtapositions. If member 20 is rotated 180° on its longitudinal axis, in either direction, it will appear identical to member 22. Thus, all of disclosed embodiments of the present invention are readily paired gripping bars of substantially identical configuration, when similarly rotated.

On member 20, interrupted arcuate surface 20 O presents linear channel 20 C, in which central boreholes, such as 20 B, are located. In the depicted embodiment, the upstanding sidewalls 48 U/48 L have an internally projecting ledges 50 U/50 L, which are spaced-apart, as to their leading edges, so as to permit access to channel planar surface 20 C, through which recessed fastening screws, like 24, are to be inserted.

Lastly, there is an optional feature which may be included to reduce member weight, and/or the cost of materials for the member fabrication. These are complemental elongate hollow chambers 20 H/22 H, defined by the inner walls of the irregular inner surface 20 I/22 I, arcuate surface 20 O/22 O, and chamber 20 C/22 C. This integral member-lightening feature is attainable by liquified metal extrusion methods well known in the art of fabricating light metallic devices.

It will be evident that the opposing inner surfaces of member 20 and 22, will dovetail snugly, so as to provide for complemental engagement, thereby serving to enclose and grip firmly any flexible sheeting material (not seen) which is interposed therebetween; also, to provide downward weighting on the perimeter of the sheeting material, normally disposed therebetween, so to achieve a downward bias in the sheeting while such is draped from a supporting rigid structure.

In FIG. 2, is presented a perspective view of another embodiment for the pair of cooperating members of the present invention, in which the confronting inner surfaces of member 60 and 62 are somewhat differently configured. The cross-section presents an inner modified planar surfaces 60 I and 62 I; generally arcuate, outer surfaces 60 O and 62 O; externally located recessed channel 60 C and 62 C; and internal hollow chambers 60 H and 62 H. The configuration of the arcuate outer surfaces and of the channels of this device are substantially identical with their counterparts in FIG. 1; however, the inner planar surfaces, 60 I/62 I, are differently configured. Member 60 is provided with a linear ridge 64, having a truncated apex 64 A, which ridge is located proximal to the upper linear channel 66 of member 60. It is also provided with a linear channel 68, having a truncated apex 68 A, which channel is located proximal to the lower linear edge 70 of member 60. The parallel ridge 64 and the channel 70 are aligned with the longer dimension of member 60, so they essentially straddle an invisible longitudinal center line of inner surface 60 I, passing through the depicted borehole thereof.

Opposing member 62 is provided with a linear ridge 72, having truncated apex 72 A, located proximal to the lower linear edge 74 of the member. It is further provided with a linear channel 76, having a truncated apex 76 A, located proximal to the upper linear edge 78 of member 62. As with the ridge and channel of member 60, ridge 72 and channel 76 straddle an invisible center line of inner surface 62 I. As with the members of FIG. 1, the inner surfaces of members 60/62 will dovetail snugly, so as to provide for complemental engagement.

The optional feature of elongate hollow chambers, 60 H and 62 H, are also depicted in FIG. 2. It is similarly defined by the just-described inner walls of the irregular planar inner surface, the arcuate outer surface, and the recessed channel surface of each of members 60/62.

In FIG. 3 is presented a perspective view of another embodiment for the cooperating members of the invention, in which the confronting inner surfaces of members 80 and 82 are differently configured. The cross-sectional view depicts modified planar surfaces 80 I and 82 I; generally arcuate outer surfaces 80 O and 82 O; external recessed channels 80 C and 82 C, and hollow chambers 80 H and 82 H. The configuration of the arcuate surfaces and recessed channels are substantially identical with their counterpart in FIGS. 1/2; however, the opposing inner surfaces are differently configured. Member 80 is provided with a linear ridge, 84 of a semi-cylindrical configuration 84 C, which ridge 84 is located proximal to upper linear edge 86 of member 80. It is also provided with a linear channel 88, also of a semi-cylindrical configuration 88 C, located proximal to lower linear edge 90 of member 82. The parallel ridge 84 and channel 88 are aligned with the longer dimension of member 80 and also essentially aligned to straddle an invisible longitudinal center line of inner surface 80 I.

Opposing member 82 is provided with its linear ridge 92, having a semi-cylindrical configuration 92 C, located proximal to the lower linear edge 94 of member 82. It is also provided with a linear channel 96, having a semi-cylindrical configuration 96 C, located proximal to the upper linear edge 98 of member 82. As with the ridges and channels of member 80, ridge 92 and channel 96 essentially straddle an invisible center line of inner surface 82 I. Also with the paired members of FIGS. 1/2, the described inner arcuate surfaces will dovetail snugly so as to provide complemental engagement.

The optional features of elongate hollow chambers, 80 H/82 H, are also depicted in FIG. 3, and they are likewise defined by the described inner walls of the irregular planar inner surface, the arcuate outer surface, and the external channel surface of each of members 80/82.

Figure 4:
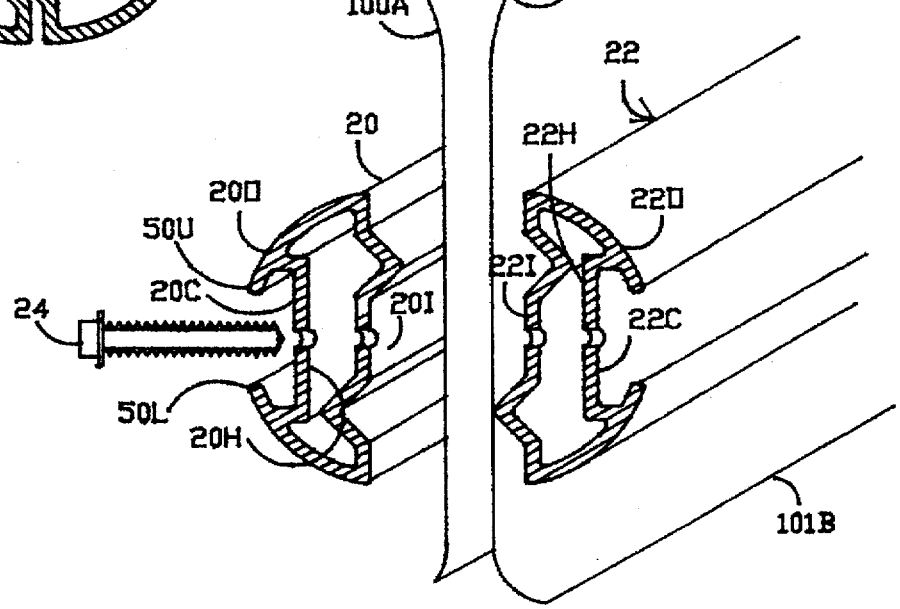
FIG. 4 depicts the elongate members of FIG. 1 about to be conjoined to enclose and to grip firmly, the inserted sheets of flexible material.

Referring now to FIGS. 4/5, two steps in the sequence of employing a device of FIG. 1 are depicted. Members 20/22 are aligned, initially spaced apart, just as depicted in FIG. 1, but now with a double ply of flexible sheeting, 100 A/B, interposed therebetween. The gripping device itself is located proximal to the lower depending edge 101 of such sheeting, which sheeting usually extends vertically upward to overlap a framework, such as a greenhouse (not seen here). When the pieces are suitably aligned, the facing members are dovetailed together, presenting the gripping bar posture of FIG. 5. Fastener 24 traverses the precut boreholes 20 B/22 B and extends at least partially through the planar wall 22 I of member 22. Spaced-apart in the same paired members, is other transverse fasteners (not seen) which will serve to lock the longitudinal ends of members 20/22 in the operating mode, as depicted.

In certain situations, an additional sheeting or material is desired to be temporarily added to the structure and to be retained by the device of the invention.

When translucent (clear) layers of sheeting are utilized to cover the sides or roof of a greenhouse, or cattle enclosures, such layers allow the sunlight to penetrate and heat the structure on warm, sunny days, to a degree that is undesirable for the plants or animals located within.

The added sheeting feature allows for the temporary attachment of an outer shade material, or opaque sheeting, to the structure covered by the device of invention, without disassembly of the completed gripping device from the inner clasped sheet(s). The additional sheeting can then be longitudinally rolled up with the original clasped sheet(s). When cooler seasons prevail, the material can be removed from its secured engagement with outer channel 22 C (FIG. 4), without disturbing the gripping effect on the original sheets.

Also depicted in FIG. 5A/B is an added element 101 (FIG. 5W) adapted to clasp another flexible sheeting material 100 C, to the outside of the roll-up device elements 20 and 22; such is employed as a temporary shade which can be attached to the clamped devices 20 and 22. Flexible sheeting 100 C can be laid over the outside arcuate surface 22 O and then manually stuffed into the recessed channel 22 C (Fi9g. 5A).

Flexible wire spring device 101 (FIG. 5W), is a conventional element and forms no part of the invention. It can be utilized with this embodiment to add to the versatility of the invention. Flexible wire spring 101 is inserted behind the internally projected ledges 51 U/51 L (over the inlaid sheeting), with an upper linear portion 103 U of the wire spring 101 being inserted behind the upward internally projected ledge 51 U, and then pushing the added flexible sheeting 100 C against the upper internal sidewall 105 U.

The lower linear portions 102 L/106 L of the wire spring 101 are alternately inserted behind the lower internally projected member ledge 51 L, thus pushing the added flexible sheeting 100 C against the lower internal sidewall 105 L. This continues throughout the wire lengths, length 106 L down, then length 108 U is up.

Looking to FIG. 5B, the several changes of direction which the flexible sheeting 100 C takes, as it folds around the lower internal projecting ledge 51 L, behind the lower linear portions like 103 U/103 L (FIG. 5A) of the wire spring 101, against the lower sidewall 105 L, along and against the bottom surface of the recessed channel 22 C, against the upper internal sidewall 105 U, behind the upper linear portions of the wire spring (FIG. 5A), and around the upper internally projecting ledge 51 U, will clasp the added flexible sheeting securely to the clasped roll-up device 20/22.

As the clasped roll-up device 20/22 is rotated, and is rolled up or down about its elongated axis, it will also roll the added flexible sheeting 100 C against the outer planar surfaces 22 O/20 O, concurrently with the rolling of the internally clasped flexible sheeting 100 A/100 B.

With this feature the added flexible sheeting 100 C can be attached to, or removed from, the roll-up device 20/22, without need for disassembly of the roll-up device 20/22 from its clasping position around the primary flexible sheeting 100 A/100 B.

Figure 5:
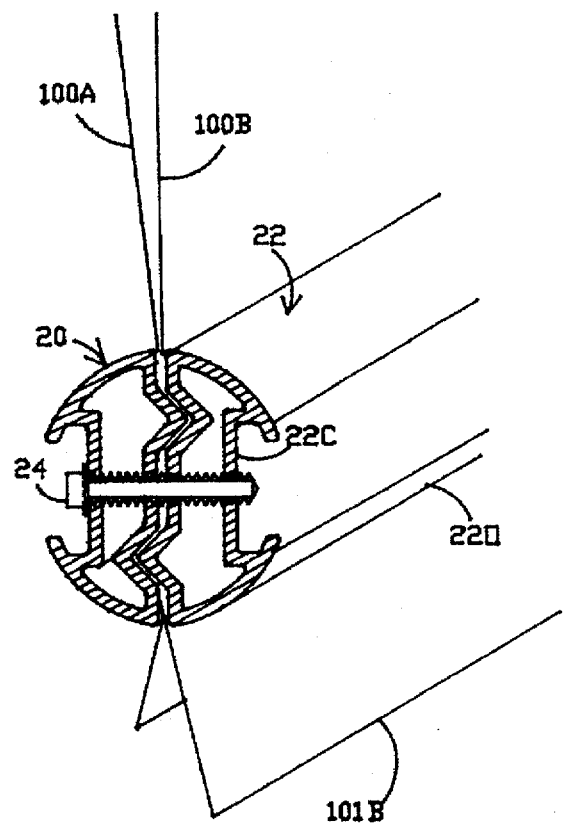
FIG. 5 depicts the members of a third embodiment (channels without ledger) when they are conjoined in gripping relation to the sheet material and retained in that mode by an elongate fastening means.
Figure 6:
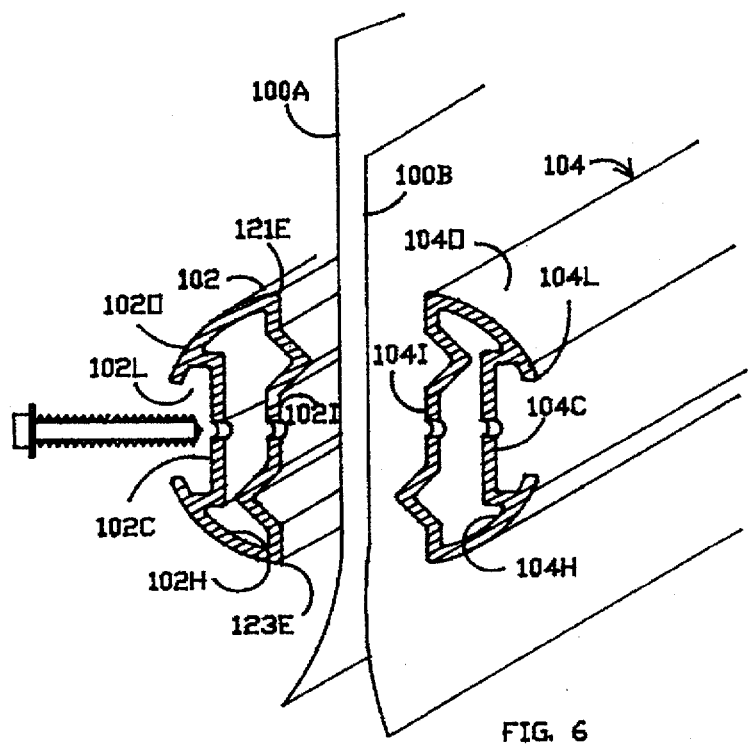
FIG. 6 is an alternate embodiment for the members of FIG. 1, but with the outer linear channel cross-section modified to provide a squared inner edge.

In FIG. 6, an assembly step identical to that of FIG. 4 is shown. However, the members 102/104 have been modified slightly. While the inner surfaces 102 I/104 I, and the hollow chambers 102 H/104 H, are substantially identical to that of FIG. 4, the outer arcuate surfaces 102 O/104 O have been modified as shown to omit the inwardly projecting ledges like 50 U, of FIGS. 1 and 4. Rather, depicted ledges 102 L/104 L are squared, thus defining rectangular, elongate recessed channels 102 C/104 C in members 102/104, respectively. Operationally, the interposed flexible material 100 A/B is then gripped and weighed down in the same manner as shown in FIG. 5.

In FIG. 7/8 are presented an longitudinal end view of yet another embodiment for the complemental gripping members of the present invention. Members 110 and 112 are seen well spaced apart in FIG. 7, while having their inner surfaces 110 I/112 I with configurations which are identical to that of FIGS. 1, 4 and 6. However, the arcuate outer surfaces and recessed channel surfaces of these members are substantially modified. Arcuate surface 110 O, is interrupted only by the longitudinal channel 110 C (of a truncated, triangular cross-section), which is centrally located in the semi-circular outer surface 110 O of member 110. Similarly, outer arcuate surface 112 O is also interruppted by a diametrically opposing channel 112 C (likewise truncated, and triangular) located central of the semi-circular of member 112.

Figure 8:
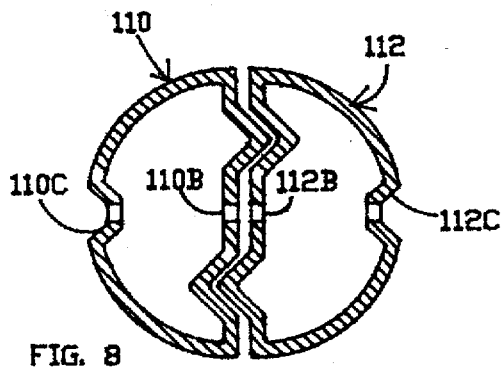
FIG. 8 is an elevational view of the device of FIG. 7 with the confronting surfaces mated without its sheet material interposed.

Elongate channels 110 C/112 C provide the running recess channel for the insertion of the fastening bolts (not seen), which will lock the seated members together during operation. Also, the central inner surface 109 L/109 R of each member is provided with a transverse borehole, 110 B/112 B, to receive a fastening bolt (not shown). In the view of FIG. 8, the members 110/112 are dovetailed to show their complemental seating, but without the interposition of the dual ply sheeting of FIG. 6. This embodiment can be used most advantageously on smaller diameter roll-up bars so that recesses for heads of fasteners, such as in FIG. 1 would not create large, flat spots on sides of small diameter roll-up bars.

Figure 9:
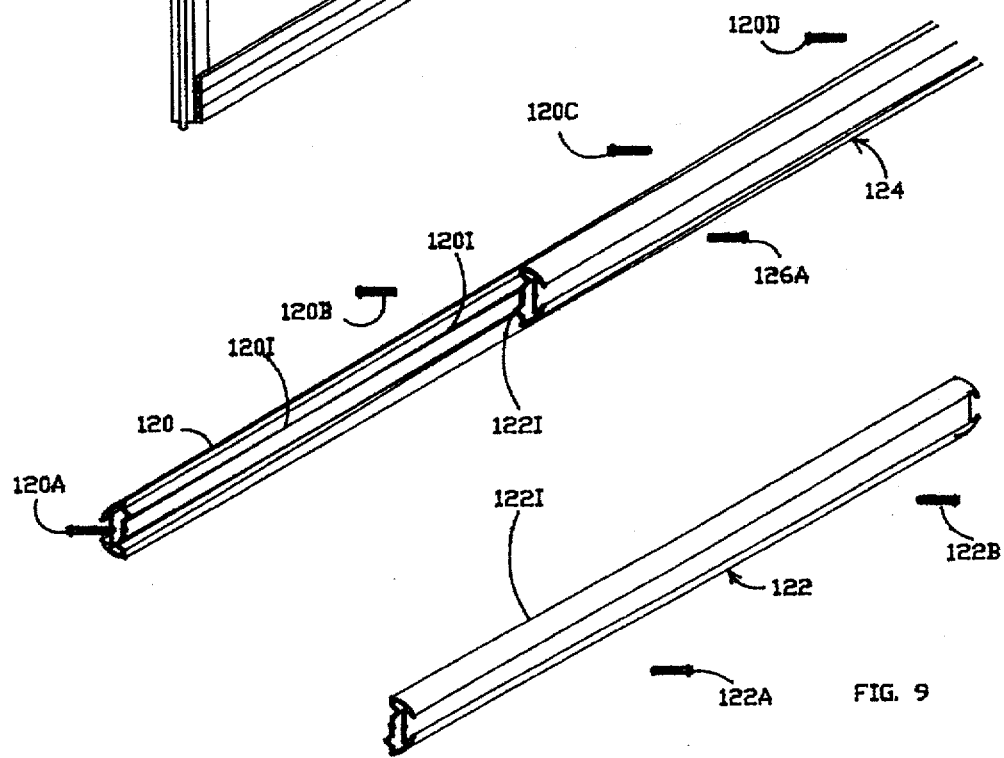
FIG. 9 is a perspective view of several finite members of the present invention one of which is overlapped and mated, to provide linear stability to an elongate section of gripping means while in use upon a flexible sidewall.

In the perspective view of FIG. 9, three elongate members, 120, 122, and 124 like those of FIG. 1, are arranged and aligned as they would be conjoined to provide an elongate gripping bar comprised of three or more members serving to grip, weight down, and maintain a frame covering sheeting, having a greater horizontal dimension than that of the individual members themselves. Note that the fastening bolts are arranged in alternate manner (one facing leftward, the next facing rightward, the next facing leftward, etc.) as they would be affixed as depicted in FIG. 1.

In the perspective view of FIG. 9, the modified planar surface 120 I of member 120 is conjoined with a complementally modified surface 122 I of member 122. Two fastening screws, 126 A/B, are aligned but spaced-apart, as they are about to be inserted into the members to retain the overlap members 120/122 together. Similarly, the modified exposed planar surface 120 I would be conjoined with the spaced-apart, exposed surface 122 I of member 122, with both of these to be held together by fastening screws 120 A/B/C and opposing screws 122 A/B. In operation, the members as shown are assembled to grip and weight down flexible sheeting (not seen).

Figure 10:
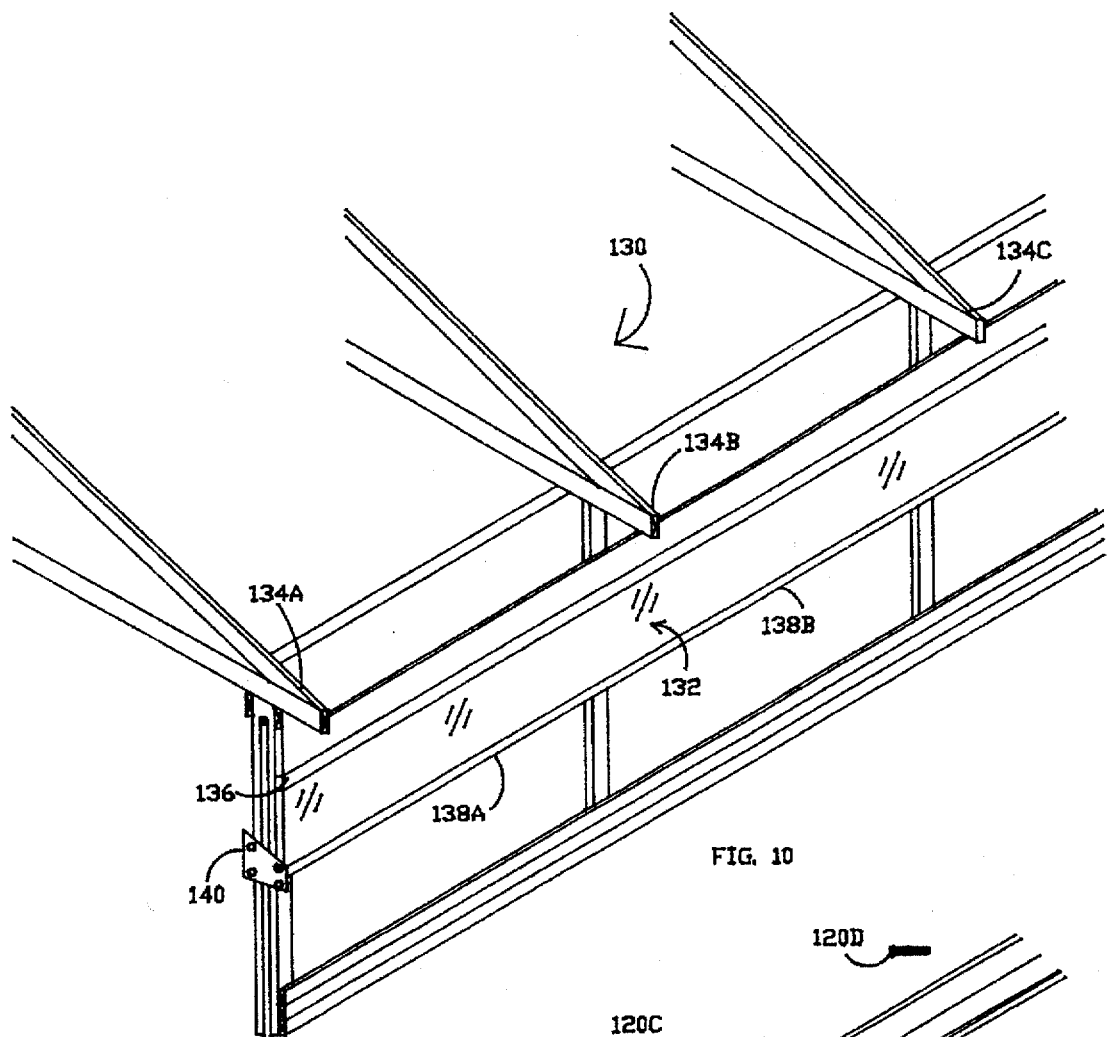
FIG. 10 is a perspective view of a pole-barn structure using flexible sheeting sidewalls, and employing the weighted gripping bars with roll-up features of the present invention to conduct airflow through the partially opened flexible sidewalls according to the present invention.

The perspective view of FIG. 10 depicts schematically a three-dimensional structure 130, known as a pole-barn, using large dimension flexible sheeting 132 as an adjustable sidewall opening, to which the present invention may be applied. The standard projecting ends of roof trusses 134 A–C, are seen, along with underlying, horizontal upper board 136. An extendable, vertical flexible sheeting 132 is draped from the upper retention board 136. Sheeting 132 is shown as partially rolled up. The elongate gripping bars of the present invention are depicted schematically as 138 A/B. The cranking mechanism 140 shown at the elongate end of device 138 A/B is conventional, and forms no part of the present invention.

By way of example, typical dimensional specifications for the exemplary pair of members depicted in FIG. 6 will now be provided for an extruded, hollow member like 102 thereof. The overall diameter from upper linear edge 121 E to lower linear edge 123 E is 2.0"; the vertical height of rectangular channel 102 C is 0.625"; the wall thickness of inner planar wall 102 I is 0.1875"; the thickness of arcuate wall 104 O and of channel wall 102 C is 0.0625"; while the thickness of the shaped portions of inner wall 102 C is 0.0938". For these dimensions, when section member is extruded from aluminum metal, the weight per linear foot of member 102 L is 0.5486 lbs. For a 20 ft. length of paired members, the device provides a downward bias on the interposed flexible sheeting of about 22 lbs. for that length. Other member wall dimensions, and choice of materials of fabrication, will provide different weightings per linear foot of flexible sheeting.

I claim:

1. A separable two member, gripping and weighting device each member having confronting, planar surfaces adapted for securely, but interruptibly, gripping any flexible sheeting material interposed therebetween, comprising:

(a) a first member of a substantially rigid, material having at least one substantially planar surface presenting a generally rectangular elongate configuration serving as its contacting surface, and having a generally arcuate outer surface serving as a rolled sheeting support surface; further comprising:

(i) a linear, channel disposed lengthwise of the one planar surface and aligned parallel and proximal to one longer dimensional edge of the rectangular configuration;

(ii) a linear, raised ridge disposed lengthwise of the same one planar surface, but aligned parallel and proximal to the other longitudinal dimension of said rectangular configuration, with the linear channel and ridge features essentially straddling the longitudinal center line of the planar surface;

(iii) a second linear channel disposed lengthwise of the arcuate outer surface and similarly aligned substantially centrally along said outer surface;

(b) a second elongate member substantially in length, dimensions and cross-sectional configuration to the first member, also having opposing planar and arcuate surfaces like the first member, and spatially oriented to make a complemental mating with the cross-sectional features of said first member, further comprising:

(i) a linear channel located lengthwise of the one planar surface and aligned parallel and proximal to one longer dimensional edge of the rectangular configuration;

(ii) a second linear raised ridge disposed lengthwise of the same one planar surface but aligned parallel and proximal to the other longitudinal dimension of said rectangular configuration, with the linear channel and ridge features being essentially straddling the longitudinal center line of the planar surface;

(iii) A second linear channel disposed lengthwise of the arcuate surface of said second member and similarly aligned, substantially centrally along the outer surface thereof; and, (c) for each finite length of the opposing and normally contacting planar surfaces of the paired first and second members, there is provided at least one transverse borehole connecting between the outside linear channel in the first arcuate surface and the outside linear channel in the second arcuate surface, such channels being adapted to receive a fastening bolt therebetween; and, (d) the spaced-apart, linear channel and linear ridge in the first member and the spaced-apart, linear channel and linear ridge in the second member being oriented for complemental engagement throughout the longitudinal direction, serving to engage and grip firmly any flexible sheeting material disposed therebetween, so to provide a downward weighting in the sheeting while same is draped over a supporting rigid structure.

2. The device of claim 1 wherein each member has its inner channel and its inner linear ridge presenting a substantially isosceles triangular cross-section configuration, so that the peripheral surfaces of each channel meets with the peripheral surfaces of each ridge in an uninterrupted plane.

3. The device of claim 2 wherein each member is provided with a substantially semi-circular cross-sectional configuration and the peripheral surfaces thereof meet tangentially along the line lying in the planar inner surface of each member.

4. The device of claim 2 wherein the triangular cross-section is equiangular.

5. The device of claim 2 wherein the triangular apex of each channel is truncated and its opposing ridge is flattened.

6. The device of claim 1 wherein an elongate, linear chamber is provided internally and lengthwise of each member, while being sized to maintain the structural integrity of the both channels and raised ridge, located within the internal surfaces of such member.

7. The device of claim 1 wherein the second linear channel in the outer arcuate surface has a substantially rectangular cross-section throughout its length.

8. The device of claim 1 wherein the open edges of the outside linear channel present projecting flanges extending inwardly toward the center line of such channel but with their leading edges being spaced-apart for fastening means access.

9. The device of claim 1 wherein each parallel pair of linear channel and linear ridge are equi-spaced apart throughout the length of the respective member.

10. The device of claim 1 wherein the outer arcuate surface of at least one of the mating member serves to engage another flexible sheeting positioned thereupon proximal to one of its linear edges.

* * * * *